(12) United States Patent
Lee, Jr.

(10) Patent No.: US 6,540,239 B2
(45) Date of Patent: Apr. 1, 2003

(54) FOLDABLE UTILITY CART

(76) Inventor: Edward W. Lee, Jr., 2422 Lightfoot Dr., Baltimore, MD (US) 21209

( * ) Notice: Subject to any disclaimer, the term of this patent is extended or adjusted under 35 U.S.C. 154(b) by 76 days.

(21) Appl. No.: 09/832,982

(22) Filed: Apr. 12, 2001

(65) Prior Publication Data

US 2002/0149163 A1 Oct. 17, 2002

(51) Int. Cl.⁷ .................................................. B62B 3/02
(52) U.S. Cl. ........................... 280/33.993; 280/33.997; 280/642; 280/47.26
(58) Field of Search ........................ 280/33.993, 33.996, 280/33.997, 47.26, 47.34, 47.35, 47.4, 641, 642, 645, 647, 651, 652, 654, 659, DIG. 3, DIG. 4

(56) References Cited

U.S. PATENT DOCUMENTS

| | | | |
|---|---|---|---|
| 1,168,008 A | * | 1/1916 | Kleine |
| 2,453,631 A | * | 11/1948 | Leser et al. |
| 3,191,956 A | * | 6/1965 | Rizzuto .................... 280/47.35 |
| 3,223,429 A | * | 12/1965 | Hastings ..................... 280/654 |
| 3,375,018 A | * | 3/1968 | Close ........................... 280/651 |
| 3,704,025 A | | 11/1972 | Cerveny et al. |
| 3,774,929 A | * | 11/1973 | Stanley |
| 3,787,063 A | * | 1/1974 | Oliver ................... 280/33.996 |
| 3,799,567 A | | 3/1974 | Toda |
| 3,992,038 A | | 11/1976 | Guadano, Sr. |
| 4,317,581 A | | 3/1982 | Kassai |
| 4,339,141 A | | 7/1982 | Thiboutot |
| 4,369,986 A | | 1/1983 | de la Fe |
| D281,365 S | | 11/1985 | Gugler |
| 4,765,646 A | | 8/1988 | Cheng |
| 4,809,996 A | * | 3/1989 | Freyman ..................... 280/641 |
| 4,986,555 A | * | 1/1991 | Andreen ................... 280/47.35 |
| 5,203,578 A | * | 4/1993 | Davidson et al. ........ 280/47.35 |
| 5,290,049 A | | 3/1994 | Crisp et al. |
| 5,294,158 A | * | 3/1994 | Cheng ......................... 280/641 |
| 5,312,122 A | | 5/1994 | Doty |
| 5,328,182 A | * | 7/1994 | Kuo ............................ 280/641 |
| 5,547,205 A | * | 8/1996 | do Rasario Sousa de Cabedo ..... 280/47.34 |
| 5,653,460 A | | 8/1997 | Fogarty |
| 5,722,594 A | | 3/1998 | Farr et al. |
| 5,848,797 A | | 12/1998 | Paez |
| 5,865,449 A | * | 2/1999 | Castaneda .............. 280/33.996 |
| 6,022,031 A | | 2/2000 | Reiland et al. |
| 6,155,592 A | | 12/2000 | Hsia |
| 6,382,652 B1 | * | 5/2002 | Cheng ......................... 280/642 |
| 6,428,034 B1 | * | 8/2002 | Bost ............................ 280/642 |

* cited by examiner

*Primary Examiner*—Brian L. Johnson
*Assistant Examiner*—Christopher Bottorff
(74) *Attorney, Agent, or Firm*—Rosenberg, Klein & Lee

(57) ABSTRACT

A foldable utility cart (10) is provided having a main basket (15), an auxiliary basket (34), a pair of front wheels (12), a pair of rear wheels (14) and a pair of auxiliary wheels (46). The primary basket (15) is formed from a plurality of links pivotally connecting a front mesh panel (16) with a rear mesh panel (18). Thus, the primary basket (15) may be folded for storage. Further, auxiliary basket (34) is similarly foldable, having a plurality of side links (41) pivotally connected to a pair of vertical rods (39, 43). Additionally, the foldable, auxiliary basket (34) has a pair of auxiliary leg members (42) pivotally extending from a lower link (40) thereof. Auxiliary wheels (46) are affixed to the lowermost ends of the auxiliary leg members (42) and allow the auxiliary wheels (46) to be folded against the rear mesh panel (18) when not required.

16 Claims, 7 Drawing Sheets

FOLDABLE UTILITY CART

BACKGROUND OF THE INVENTION

1. Field of the Invention

The subject invention relates to a foldable utility cart having a primary basket, an auxiliary basket, and a pair of supporting auxiliary wheels. In particular, the present invention directs itself to a foldable utility cart having a primary basket formed of a front mesh panel, a rear mesh panel, and a plurality of links, each of said links being pivotally connected at both ends to the front and rear mesh panels. Thus, the primary basket may be collapsed for storage purposes. Further, the present invention directs itself to a foldable utility cart having an auxiliary basket, the auxiliary basket also having a plurality of links pivotally connected at each end, allowing the auxiliary basket to also be folded for storage purposes.

Further, the auxiliary basket has a pair of leg members pivotally connected to a lower end thereof and extending downwardly. The leg members are connected to one another by an auxiliary axle, the auxiliary axle having a pair of auxiliary wheels affixed thereto. The pivotal connection between the leg members and the auxiliary basket allows the auxiliary wheels to be folded against the rear mesh panel of the primary basket when the auxiliary wheels are not required for use. This invention directs itself to a folding utility cart having a primary basket, a foldable, auxiliary basket, and a pair of auxiliary wheels wherein both the primary basket and the foldable, auxiliary basket may be collapsed for storage purposes and the auxiliary wheels may be folded against the rear mesh panel of the primary basket when not needed.

In particular, the subject invention foldable utility cart directs itself to a utility cart having a primary basket and an auxiliary basket having a pair of stabilizing wheels. When a large weight, such as a child, is located in the auxiliary basket the center of gravity of the cart is displaced. The stabilizing wheels contact a base surface or floor when the center of gravity shifts sufficiently and maintains the utility cart in a stabilized position.

2. Prior Art

Foldable utility baskets are known in the art. In general, such prior art utility carts include a basket having front and rear mesh panels connected by a plurality of pivotal links. Further, utility carts having auxiliary baskets are known in the art. In many instances, the problems of such prior art auxiliary baskets are that the auxiliary baskets are not foldable and are merely awkward add-ons to pre-existing utility carts. Further, prior art utility carts having auxiliary baskets are not easily stored. The auxiliary baskets generally are not collapsible themselves and, thus, do not allow for the entire cart, auxiliary basket included, to be collapsed for storage. It is a purpose of the subject invention to provide a foldable utility cart having both a primary basket and an auxiliary basket, both of which may be collapsed easily for storage purposes. It is a further purpose of the subject invention to provide a pair of auxiliary wheels connected to the auxiliary basket which may be folded against the primary basket when not needed.

One such prior art utility cart is shown in U.S. Pat. No. 4,339,141. This reference is directed to a collapsible folding cart. The cart includes a front mesh panel, a rear mesh panel, and a plurality of links pivotally connecting both of the panels. However, the cart does not include an auxiliary basket or a pair of auxiliary wheels.

Another such prior art cart is shown in U.S. Pat. No. 5,312,122. This reference is directed to shopping cart attachments. The shopping cart attachments are in the form of auxiliary baskets having auxiliary wheels affixed thereto. However, the auxiliary wheels extending from the auxiliary basket are not foldable against the rear of the primary basket. Additionally, although the positioning between the primary basket and the auxiliary basket may be adjusted, it is not fully collapsible.

U.S. Pat. No. 4,765,646 is directed to a collapsible shopping cart. This shopping cart includes a front mesh panel, a rear mesh panel, and a plurality of pivoting links joining the two panels. However, the system does not include an auxiliary basket or a pair of auxiliary wheels.

U.S. Pat. No. 3,704,025 is directed to a folding cart. This folding cart includes an auxiliary cart member having a pair of auxiliary wheels affixed thereto. However, the auxiliary cart is not collapsible, nor are the wheels selectively held against the rear of the primary cart member.

Another prior art system is shown in U.S. Pat. No. 6,155,592. This reference is directed to a foldable supporting frame for a stroller. The folding auxiliary frame has a pair of auxiliary wheels affixed thereto which fold against the main stroller structure. However, the stroller itself does not include a folding primary basket having a plurality of pivoting links affixed thereto.

None of the prior art provides for a combination of elements forming a folding utility cart having both a foldable, collapsible main basket, a foldable, collapsible auxiliary basket, and a pair of auxiliary wheels which may be held against the rear of the main basket when not in use for the purpose of stabilizing the utility cart when a large weight is positioned within the auxiliary basket.

SUMMARY OF THE INVENTION

The present invention provides for a foldable utility cart having a primary basket, an auxiliary basket, and a pair of auxiliary wheels coupled to the auxiliary basket. The primary basket is formed from a front mesh panel, a rear mesh panel, and a plurality of pivoting links joining the two panels. Thus, the primary panel may be collapsed for storage purposes. Similarly, the foldable, auxiliary basket is also formed from a plurality of pivoting links and may also be collapsed, in a similar manner, for purposes of storage. The auxiliary basket has extending downwardly therefrom a pair of pivoting leg members. The pivoting leg members are connected by an auxiliary axle, the auxiliary axle having the pair of auxiliary wheels affixed thereto. The auxiliary wheels may be held against the rear mesh panel of the primary basket when not needed.

It is a principal objective of the subject foldable utility cart to provide a utility cart having a primary basket which is collapsible for purposes of storage.

It is a further objective of the subject foldable utility cart to provide an auxiliary basket which may be collapsed for purposes of storage.

It is a further objective of the subject invention to provide a pair of auxiliary wheels for a foldable utility cart which may be held against the primary basket of the cart when not needed.

It is a further objective of the subject invention concept to provide a pair of auxiliary supporting legs extending from an auxiliary, folding basket and having a pair of auxiliary wheels affixed thereto for providing additional support for the foldable utility cart.

It is an important objective of the present invention to provide a foldable utility cart having, in combination, a primary basket, an auxiliary basket, and a pair of auxiliary wheels, all of which may be collapsed and held together for purposes of storage, the collapsed utility cart occupying a minimum of space.

It is of primary importance to provide a stabilizing mechanism for a utility cart when the center of gravity of the utility cart is displaced.

DESCRIPTION OF THE PREFERRED EMBODIMENTS

Figure 1:
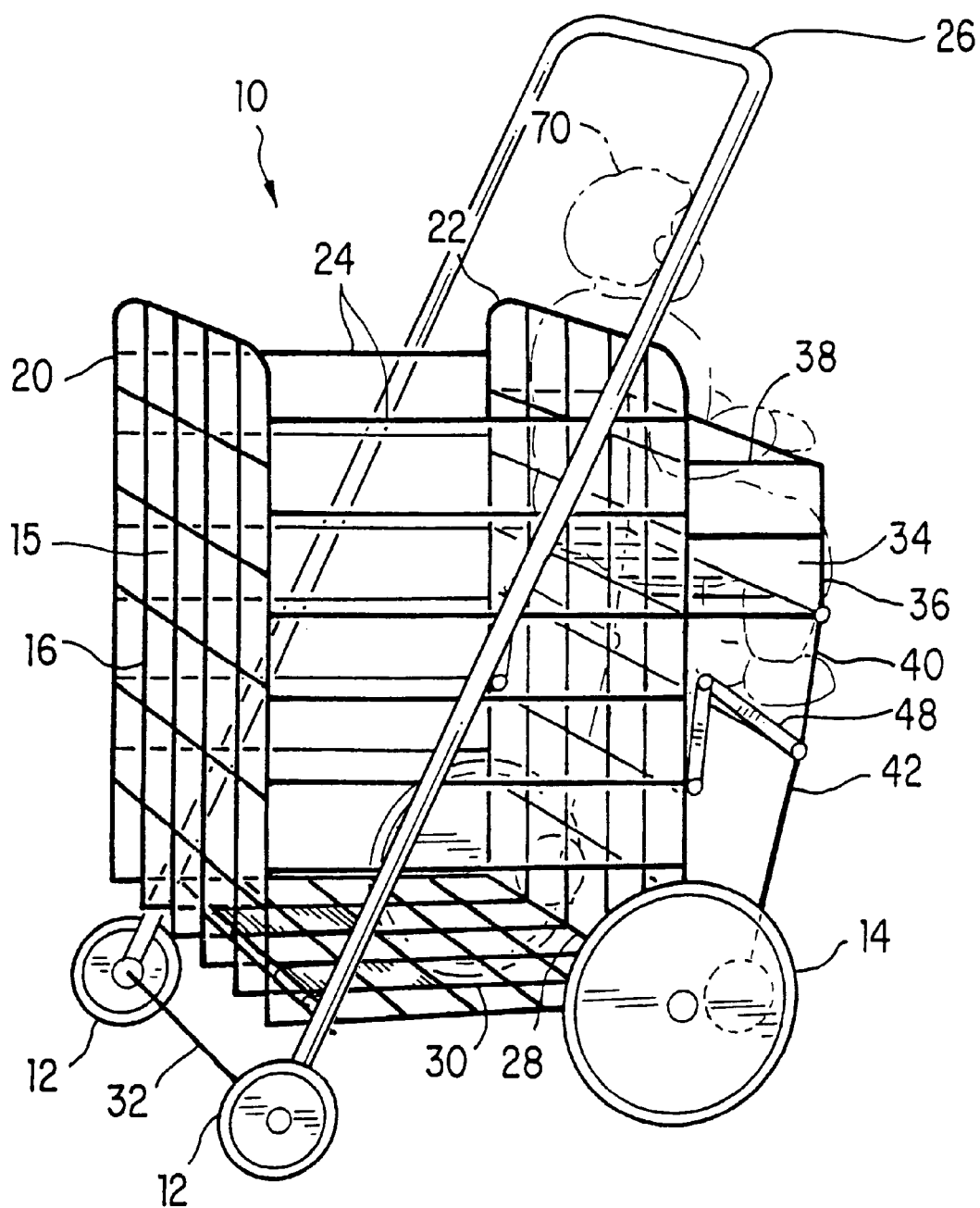
FIG. 1 is a perspective view of the subject foldable utility cart with a child seated in the auxiliary basket.
Figure 2:
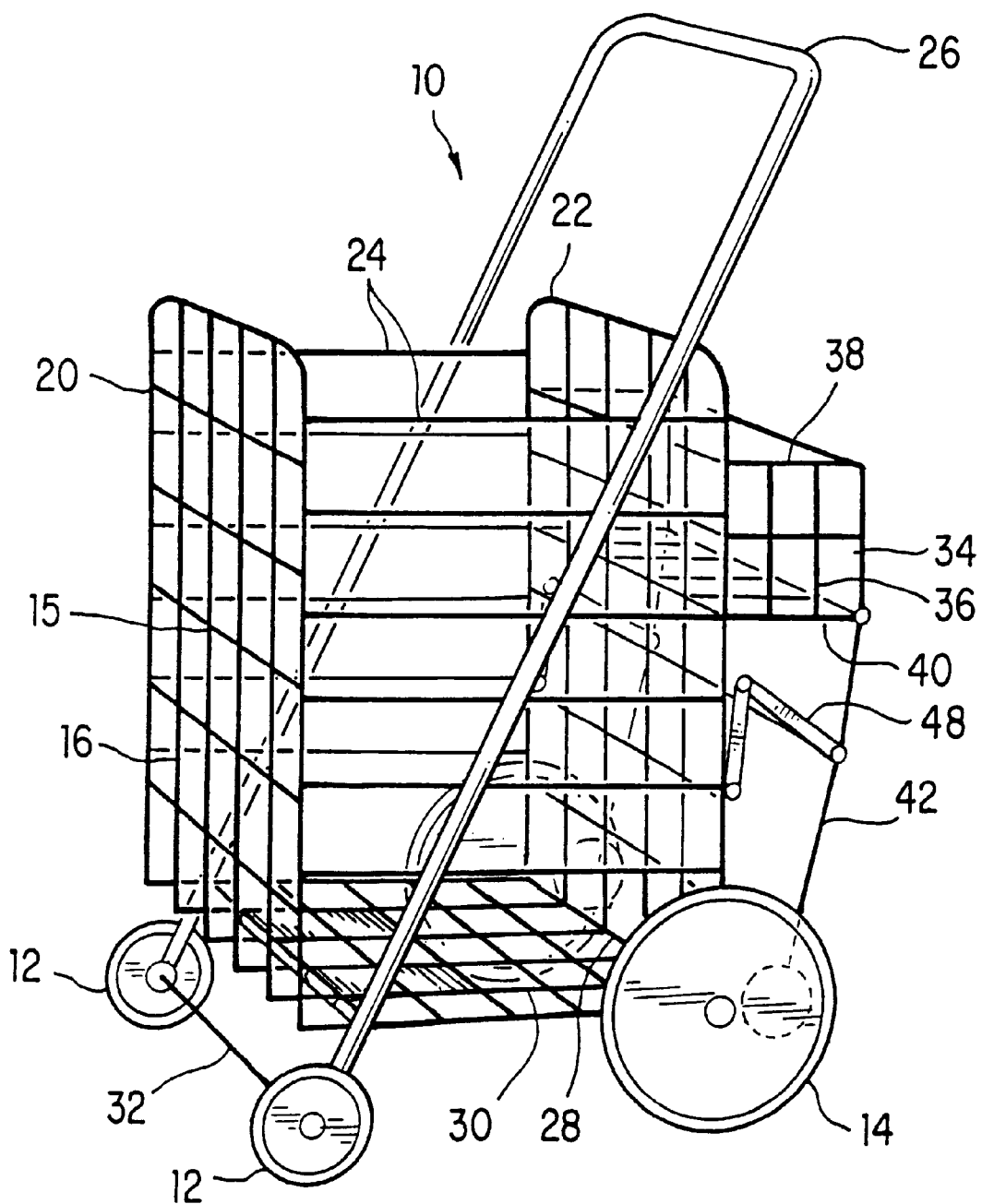
FIG. 2 is a perspective view of the subject foldable utility cart with the auxiliary basket empty.
Figure 3:
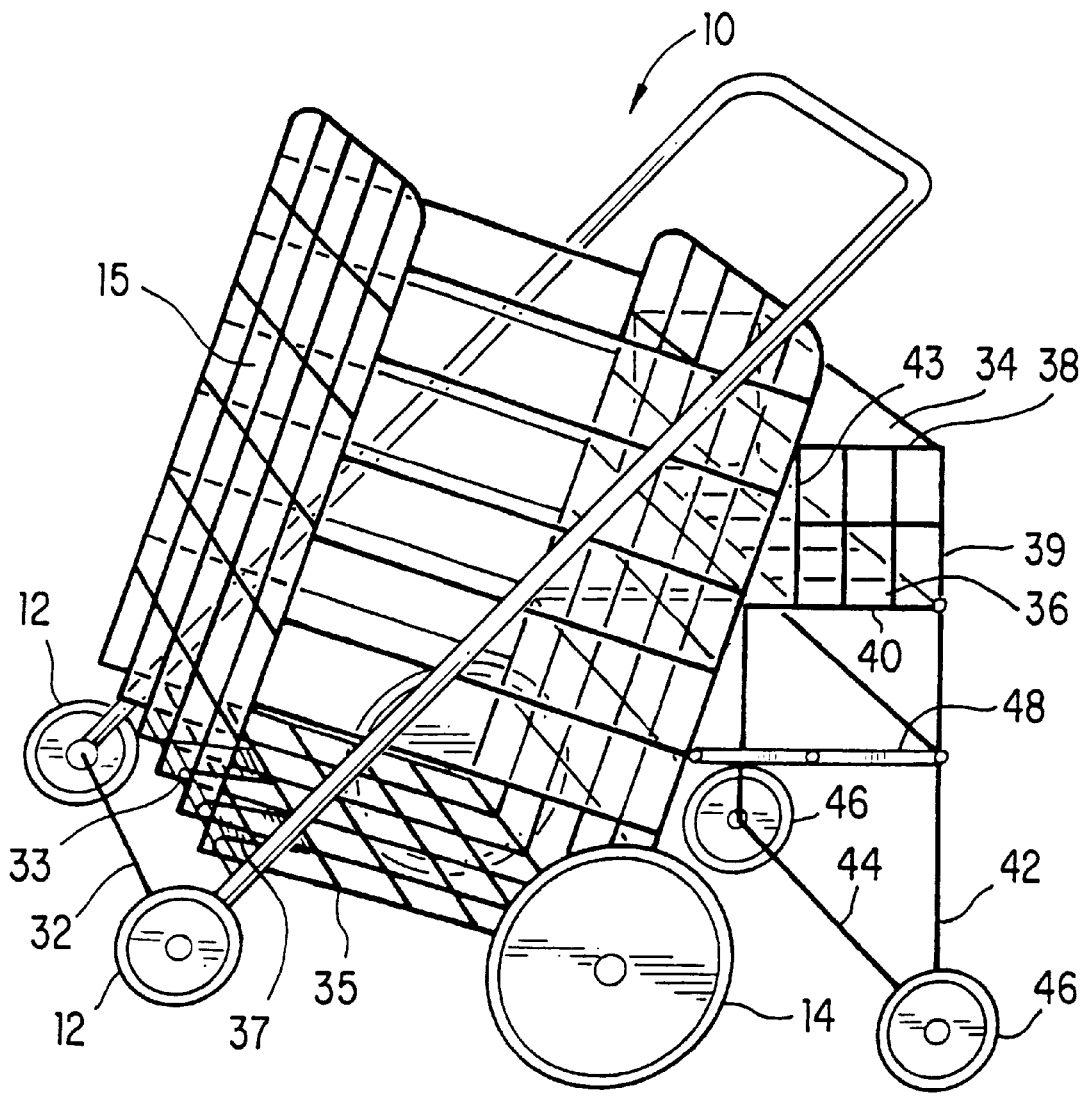
FIG. 3 is a perspective view of the foldable utility cart with the collapsible longitudinal rods fully extended, allowing the cart to be supported on the auxiliary wheels.
Figure 4:
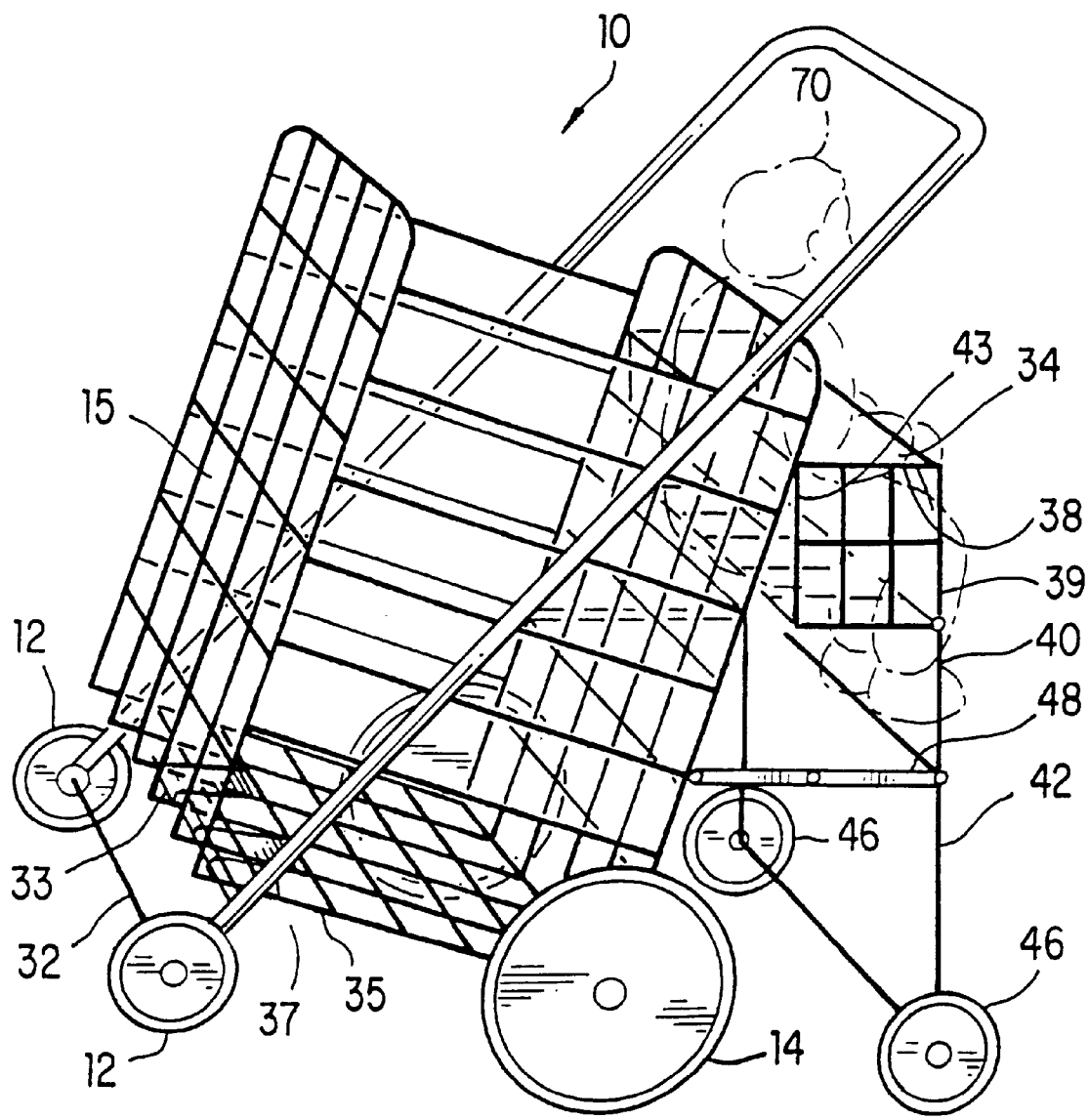
FIG. 4 is a perspective view of the foldable utility cart with the collapsible, longitudinal rods fully extended allowing the utility cart to be supported by the auxiliary wheels, with a child seated in the auxiliary basket.

Referring to FIGS. 1–6, there is shown a foldable utility cart 10. As best shown in FIGS. 1–4, the foldable utility cart includes a primary basket 15, a pair of front wheels 12, a pair of rear wheels 14, and an auxiliary basket 34. FIGS. 1 and 4 illustrate a child 70 seated within the auxiliary basket 34, however, the auxiliary basket 34 may be used to hold groceries, packages, or the like.

Figure 6:
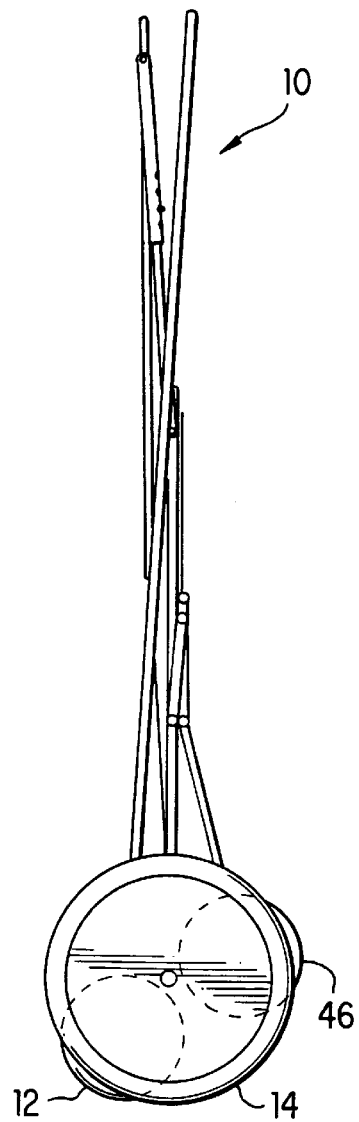
FIG. 6 is a side elevational view of the foldable utility cart folded for storage.

As shown in FIGS. 1 and 2, the primary basket 15 is formed from front mesh panel 16, rear mesh panel 18, lower mesh panel 30, and a plurality of links 24. Front mesh panel 16 is bounded by an inverted U-shaped frame 20 and rear mesh panel 18 is similarly bounded by an inverted U-shaped frame 22. The plurality of links 24 connect the front inverted U-shaped frame 20 to the rear inverted U-shaped frame 22. The links 24 are pivotally connected at both ends to U-shaped frames 20 and 22, allowing the foldable utility cart 10 to be folded for storage, as shown in FIG. 6 of the Drawings.

A rear axle 28 connects the two lower ends of the rear inverted U-shaped frame 22. Rear axle 28 extends beyond the U-shaped frame 22 and has the pair of rotatable rear wheels 14 affixed to opposite ends thereof.

Figure 5:
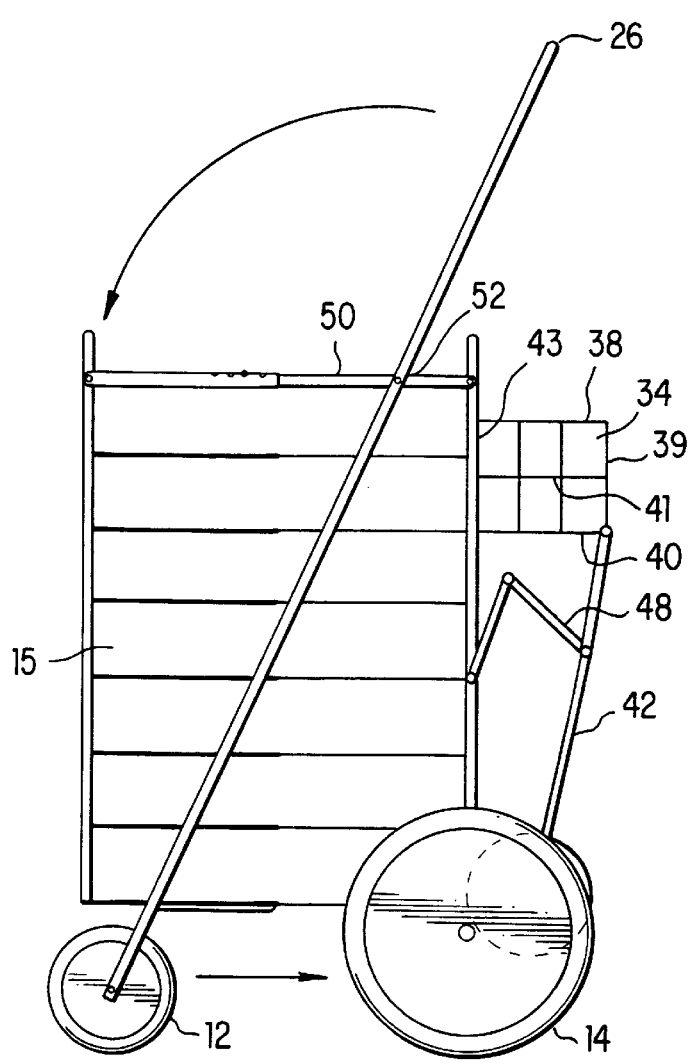
FIG. 5 is a side elevational view of the foldable utility cart.

As shown in FIGS. 2 and 5, a handle member 26 forms an inverted U-shaped frame which is pivotally connected to the uppermost pair of links 50. As shown in FIG. 5, pivotal means 52 holds handle member 26 in pivotal relationship with the uppermost links 50. The pivoting means 52 may be a nut, bolt, screw, or any other such pivotal fixing means.

Handle member 26 may be covered with a resilient cover for increasing frictional grip with the handle. The cover may be a plastic, rubber, or any other suitable resilient material.

Front axle 32, best seen in FIGS. 2 and 3, connects the lowermost ends of the handle member 26. The front axle 32 extends beyond the handle member 26 and has the pair of front wheels 12 affixed at opposite ends thereto. As shown in FIGS. 3 and 4, a first transverse rod 33 also connects the legs of handle member 26 above front axle 32. First transverse rod 33 is held in place, with respect to the lower mesh panel 30, by a pair of swing plates 37. Swing plates 37 have a first end pivotally connected to a second transverse rod 35, the second transverse rod 35 being one of the rods making up lower mesh panel 30. The other end of the swing plate 37 pivotally receives first transverse rod 33.

As shown in FIGS. 3 and 4, the foldable, auxiliary basket 34 includes a pair of side mesh panels 36. Side mesh panels 36 are formed of pivotal link members similar to those forming the primary basket 15. Each of the side mesh panels 36 has an upper link 38 pivotally connected at one end to the rear inverted U-shaped frame 22 of the primary basket 15. The side mesh panels 36 of the foldable, auxiliary basket 34 also have a lower link 40 having a pair of auxiliary leg members 42 pivotally connected thereto and extending downwardly therefrom.

As best shown in FIG. 5, each of the side mesh panels 36 of the auxiliary basket 34 is formed of a plurality of side link members 41 pivotally connected to a pair of vertical frame rods 43 and 39. The pivotal connection at both ends of the side link members 41 with respect to the vertical rods 39, 43 allows the foldable, auxiliary basket 34 to be collapsed for storage purposes.

As shown in FIGS. 3 and 4, in each of the side mesh panels 36, the vertex formed by the intersection of vertical rod 43 and the upper link 38 is pivotally connected with the rear inverted U-shaped frame 22. Additionally, the vertex formed by the intersection of vertical rod 39 and the lower link 40 is pivotally connected to a pair of auxiliary leg members 42. The pivotal connection between vertical rod 43, upper link 38, and the rear inverted U-shaped frame 22 allows the foldable, auxiliary basket 34 to remain substantially parallel relative to the ground or floor when the foldable utility cart 10 is supported by the auxiliary wheels 46, as shown in FIG. 3. The pivotal connection between the auxiliary leg members 42 and the lower link 40 and vertical rod 39 allows the auxiliary leg members 42 to be positioned in a collapsed state, as shown in FIG. 2, or positioned in the extended state shown in FIG. 3.

An auxiliary axle 44 connects the lowermost ends of the auxiliary leg members 42 and extends beyond them. A pair of auxiliary wheels 46 are affixed to opposite ends of the auxiliary axle 44.

A pair of collapsible longitudinal rods 48, as shown in FIGS. 3 and 5 connect the pair of auxiliary leg members 42 to the rear inverted U-shaped frame 22. As shown in FIG. 5, the longitudinal rods 48 are collapsible and are pivotally connected on both ends to the auxiliary leg members 42 and the inverted U-shaped frame 22. The collapsible longitudinal rods 48 allow the pair of auxiliary wheels 46 to be folded against the rear mesh panel 18 and the rear inverted U-shaped frame 22 when the auxiliary wheels 46 are not needed. However, when it is desired to utilize the auxiliary pair of wheels 46, the pair of longitudinal rods 48 may be extended, as shown in FIGS. 3 and 4 so that the pair of auxiliary wheels 46 extend to meet the ground or floor.

As shown in FIGS. 2 and 3, each of the auxiliary wheels 46 has a diameter approximately half that of the diameter of the rear wheels 14. This allows the auxiliary wheels 46 to be stored behind the rear wheels 14 when not needed. Further, the front wheels 12 also have a diameter approximately half that of the rear wheels 14. As shown in FIG. 6, both the auxiliary wheels 46 and the front wheels 12 are positioned behind the outer faces of the pair of rear wheels 14 when the foldable utility cart 10 is collapsed for storage.

As shown in FIGS. 3 and 4, when the auxiliary wheels 46 are utilized and the longitudinal rods 48 are extended, the foldable utility cart 10 is supported only by the pair of rear wheels 14 and the auxiliary wheels 46. However, due to the pivotal connection between the upper links 38 of the pair of side mesh panels 36 of the auxiliary basket 34, the auxiliary basket 34 remains parallel to the ground or floor. This positioning is, of course, preferable when a child 70, or other fragile cargo, is seated within foldable, auxiliary basket 34.

As shown in FIGS. 5 and 6, the foldable utility cart 10 may be easily folded for storage purposes. The plurality of links 24 have pivotal connections at both ends, pivotally connecting the links to both front inverted U-shaped frame 20 and rear inverted U-shaped frame 22. Additionally, handle member 26 is pivotally connected to the uppermost pair of links 50 by pivotal means 52. Similarly, the auxiliary, foldable basket 34 has side mesh panels 36, each of which is formed from side link members 41 pivotally connected at both ends to vertical rods 39 and 43. Thus, the auxiliary, foldable cart 34 is foldable in a similar manner to the primary basket 15. Both the primary basket 15 and the auxiliary, foldable basket 34 may be collapsed into the storage state shown in FIG. 6.

Figure 7:
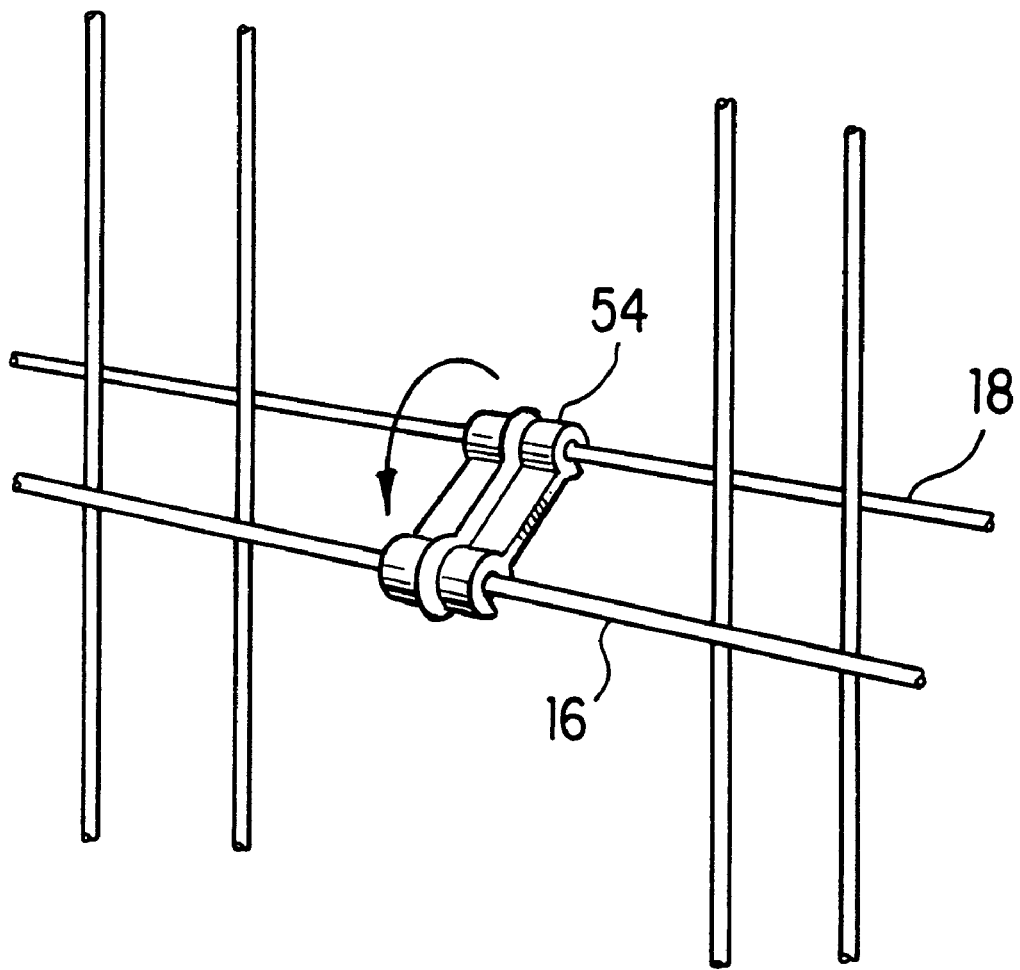
FIG. 7 is a perspective view partially cut-away of the hook member for connecting the front and rear mesh panels of the foldable cart when the cart is folded for storage.

As shown in FIG. 7, a hook member 54 is provided for releasably holding front mesh panel 16 to rear mesh panel 18. The hook member 54 is permanently pivotally connected to rear mesh panel 18. The front portion of the hook member 54 has a releasable catch for holding one of the horizontal rods making up front mesh panel 16. Hook member 54 catches one of the horizontal rods of the front mesh panel 16 when the foldable utility cart 10 is collapsed and folded for storage. When it is desired to unfold the foldable, utility cart 10, the front portion of hook member 54 is released from the horizontal rod of the front mesh panel 16 and the foldable utility cart 10 may be unfolded for use. The hook member 54 may be made of a plastic, or other suitable material.

Figure 8:
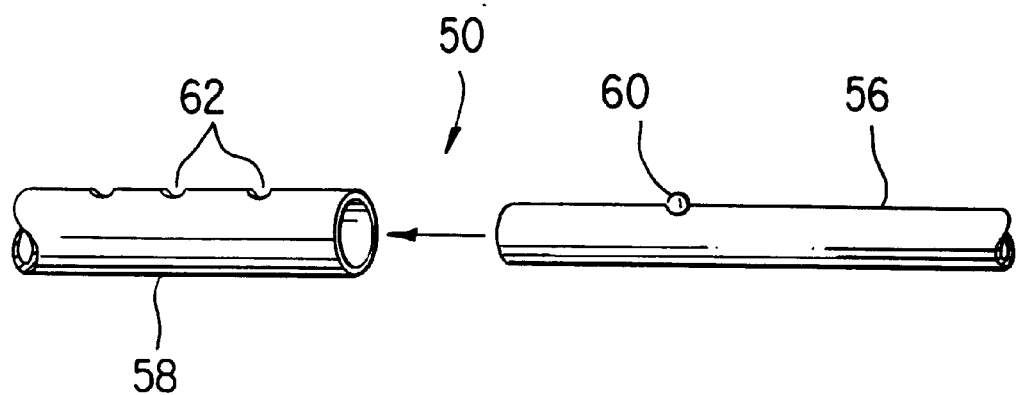
FIG. 8 is an exploded view of an uppermost link.
Figure 9:
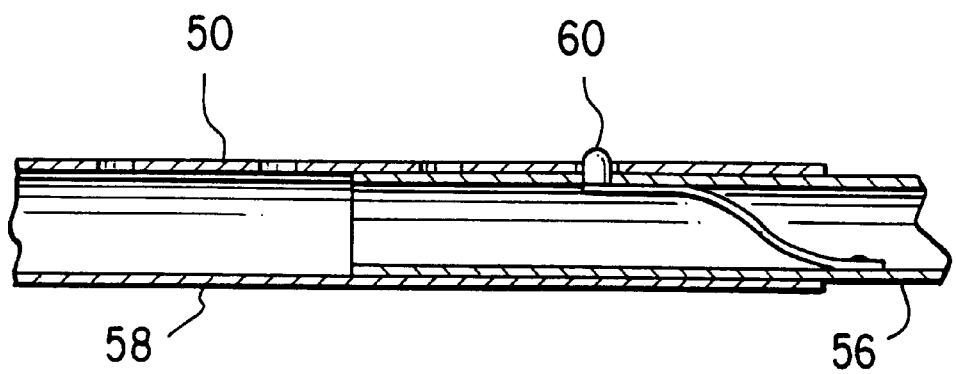
FIG. 9 is a cross-sectional view of an uppermost link.

Each of the plurality of links 24 may form telescoping rods. FIGS. 8 and 9 illustrate uppermost link 50 formed as a telescoping rod having an inner rod 56 received within an outer barrel 58. Inner rods 56 have locking protrusions 60 which are generally spring biased protrusions formed thereon well known in the prior art, the locking protrusions 60 being received within holes 62 formed through the outer barrel 58. Thus, the inner rod 56 may be releasably positioned with respect to outer barrel 58. Due to the plurality of holes 62 formed through the outer barrels 58, the dimensions of the primary basket 15 may be increased or decreased in locking fashion depending on the needs of the user.

The foldable utility cart 10 has three operative states of use. The first state, illustrated in FIGS. 1 and 2, resembles an ordinary utility cart having an auxiliary basket affixed thereto. The cart is supported by front wheels 12 and rear wheels 14. Auxiliary wheels 46 are positioned against the rear axle 28 and are not in use.

The second operative state of the foldable utility cart 10 is illustrated in FIGS. 3 and 4. The pair of longitudinal rods 48 are extended, positioning the pair of auxiliary wheels 46 away from the rear axle 28. The foldable utility cart 10 is supported in this position by rear wheels 14 and auxiliary wheels 46. The auxiliary basket 34 is pivotally connected to the rear inverted U-shaped frame 22 so that the auxiliary basket 34 remains parallel to the ground when the main basket 15 is inclined.

The third operative state of the foldable utility cart is shown in FIG. 6. The pivotal connections of links 24 with the front and rear inverted U-shaped frames 20 and 22 allow the primary basket 15 of the foldable utility cart 10 to be collapsed. The similar folding structure of auxiliary basket 34 and the collapsible longitudinal rods 48 allow the auxiliary basket 34, the auxiliary leg members 42 and the pair of auxiliary wheels 46 to be folded against the folded primary basket 15. Thus, the foldable utility cart of FIG. 6 occupies a minimum amount of space which is ideal for storage purposes. As shown, both front wheel 12 and auxiliary wheel 46 have diameters approximately one-half the diameter of rear wheel 14. Thus, both the front wheel 12 and auxiliary wheel 46 may be foldable behind rear wheel 14 during storage.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, all without departing from the spirit or scope of the invention as defined in the appended claims.

What is claimed is:

1. A foldable utility cart comprising:
    a foldable primary basket having a front inverted U-shaped frame defining a front mesh panel, a rear inverted U-shaped frame defining a rear mesh panel, said front and rear inverted U-shaped frames coupled each to the other by a plurality of link members, each of said link members having a front end and rear end pivotally connected to said front inverted U-shaped frame and said rear inverted U-shaped frame at opposing ends thereof;
    a pair of primary front wheels and a pair of primary rear wheels rotatably coupled to said primary basket; and,
    a foldable auxiliary basket foldably coupled to said rear mesh panel, said foldable auxiliary basket having a pair of foldable wheel members pivotally coupled thereto, said foldable auxiliary basket having a pair of auxiliary leg members pivotally connected thereto and extending downwardly therefrom, said auxiliary leg members being connected each to the other by an auxiliary axle, said foldable wheel members being mounted on said auxiliary axle.

2. The foldable utility cart as recited in claim 1 wherein a handle member is pivotally connected to an uppermost pair of link members of said foldable primary basket.

3. The foldable utility cart as recited in claim 1, wherein a pair of collapsible, longitudinal rods connect said pair of auxiliary leg members to said rear inverted U-shaped frame.

4. The foldable utility cart as recited in claim 1 wherein each of said plurality of link members form a telescoping rod, each of said telescoping rods having an inner rod received within an outer barrel.

5. The foldable utility cart as recited in claim 1 wherein a hook member connects said front mesh panel and said rear mesh panel when said foldable utility cart is folded for storage.

6. The foldable utility cart as recited in claim 2 wherein said handle member has a resilient cover formed thereon.

7. The foldable utility cart as recited in claim 1 wherein each of said primary rear wheels has a diameter greater than a diameter of each of said foldable wheel members.

8. The foldable utility cart as recited in claim 1 wherein said foldable auxiliary basket is pivotally coupled to said rear inverted U-shaped frame.

9. A foldable utility cart comprising:
a foldable primary basket having a front inverted U-shaped frame defining a front mesh panel, a rear inverted U-shaped frame defining a rear mesh panel, said front and rear inverted U-shaped frames coupled each to the other by a plurality of link members, each of said link members having a front end and rear end pivotally connected to said front inverted U-shaped frame and said rear inverted U-shaped frame at opposing ends thereof;
a pair of primary front wheels and a pair of primary rear wheels rotatably coupled to said primary basket; and,
a foldable auxiliary basket foldably coupled to said rear mesh panel, said foldable auxiliary basket having a pair of foldable wheel members pivotally coupled thereto, said foldable auxiliary basket having a pair of side mesh panels, each of said side mesh panels defined by a pair of vertical rod members and a plurality of side link members, each of said pairs of vertical rods being pivotally connected one to the other by said plurality of side link members, said foldable auxiliary basket having a pair of auxiliary leg members pivotally connected thereto and extending downwardly therefrom, said auxiliary leg members being connected each to the other by an auxiliary axle, said foldable wheel members being mounted on said auxiliary axle.

10. The foldable utility cart as recited in claim 9 wherein a handle member is pivotally connected to an uppermost pair of link members of said foldable primary basket.

11. The foldable utility cart as recited in claim 9, wherein a pair of collapsible, longitudinal rods connect said pair of auxiliary leg members to said rear inverted U-shaped frame.

12. The foldable utility cart as recited in claim 9 wherein each of said plurality of link members form a telescoping rod, each of said telescoping rods having an inner rod received within an outer barrel.

13. The foldable utility cart as recited in claim 9 wherein a hook member connects said front mesh panel and said rear mesh panel when said foldable utility cart is folded for storage.

14. The foldable utility cart as recited in claim 9 wherein said handle member has a resilient cover formed thereon.

15. The foldable utility cart as recited in claim 9 wherein each of said primary rear wheels has a diameter greater than a diameter of each of said foldable wheel members.

16. The foldable utility cart as recited in claim 9 wherein said foldable auxiliary basket is pivotally coupled to said rear inverted U-shaped frame.

* * * * *